US008589475B2

(12) United States Patent
Eccles

(10) Patent No.: US 8,589,475 B2
(45) Date of Patent: Nov. 19, 2013

(54) MODELING A CLOUD COMPUTING SYSTEM

(75) Inventor: Jonathan Richard Eccles, Reading (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 904 days.

(21) Appl. No.: 12/695,622

(22) Filed: Jan. 28, 2010

(65) Prior Publication Data

US 2011/0185014 A1 Jul. 28, 2011

(51) Int. Cl.
*G06F 15/16* (2006.01)
*G06F 15/173* (2006.01)

(52) U.S. Cl.
USPC ............ 709/203; 709/201; 709/226; 709/204

(58) Field of Classification Search
None
See application file for complete search history.

(56) References Cited

U.S. PATENT DOCUMENTS

| | | | | |
|---|---|---|---|---|
| 5,960,439 | A | 9/1999 | Hamner et al. | |
| 6,687,707 | B1 * | 2/2004 | Shorter | 1/1 |
| 7,054,867 | B2 * | 5/2006 | Bosley et al. | 1/1 |
| 7,647,329 | B1 * | 1/2010 | Fischman et al. | 707/999.1 |
| 2003/0126122 | A1 * | 7/2003 | Bosley et al. | 707/3 |
| 2006/0248026 | A1 | 11/2006 | Aoyama et al. | |
| 2009/0228967 | A1 * | 9/2009 | Gbadegesin et al. | 726/8 |
| 2010/0125664 | A1 * | 5/2010 | Hadar et al. | 709/224 |
| 2010/0198972 | A1 * | 8/2010 | Umbehocker | 709/226 |
| 2010/0217865 | A1 * | 8/2010 | Ferris | 709/226 |
| 2010/0306354 | A1 * | 12/2010 | DeHaan et al. | 709/222 |
| 2011/0126197 | A1 * | 5/2011 | Larsen et al. | 718/1 |
| 2011/0131329 | A1 * | 6/2011 | Kaplinger et al. | 709/226 |
| 2011/0138047 | A1 * | 6/2011 | Brown et al. | 709/226 |

* cited by examiner

*Primary Examiner* — Umar Cheema

(57) ABSTRACT

A method for modeling a cloud computing system services performed by a physical computing system includes assigning, with the physical computing system, a unique index value from a number sequence to a number of objects of the cloud computing system; creating, with the physical computing system, a number of configuration values, each configuration value based on a combination of index values, each configuration value representing a unique combination of the objects associated with the cloud computing system; and associating, with the physical computing system, a number of sub-index values to each configuration value, the sub-index values being based on a characteristic of the unique combination of the objects indicated by the configuration value.

22 Claims, 7 Drawing Sheets

Chart (300)

Objects (302)

| Column 1 | Column 2 | Column 3 |
|---|---|---|
| Physical Device 1 | 3 | 1 |
| Physical Device 2 | 5 | 0 |
| Physical Device 3 | 7 | 0 |
| Physical Device 4 | 11 | 1 |
| Virtual Device 1 | 13 | 1 |
| Virtual Device 2 | 17 | 0 |
| Service 1 | 19 | 1 |
| Service 2 | 23 | 0 |

Physical Devices (304)

Virtual Devices (306)

Services (308)

LSB (316)

Number Sequence (310)

MSB (318)

Index Values (320)

Prime Number Sequence (312)

Bitmap Sequence (314)

| | | |
|---|---|---|
| Configuration Value (322) | 46 | 89 |

*Fig. 3*

Sub-Index Chart (400)

Configuration Values (402) | Sub-Index Values (404)

| Configuration Values (402) | Complexity (406) | Resilience (408) |
|---|---|---|
| 3 | 8 | 56 |
| 5 | 7 | 54 |
| 7 | 14 | 58 |
| 8 | 48 | 46 |
| 10 | 35 | 34 |
| 11 | 7 | 22 |
| 12 | 46 | 40 |
| 13 | 23 | 26 |
| 14 | 52 | 35 |

Complexity (406) Resilience (408)

*Fig. 4*

MODELING A CLOUD COMPUTING SYSTEM

BACKGROUND

Cloud computing refers to the process of utilizing multiple pieces of hardware over a network to perform specific computing tasks. Cloud computing typically employs virtualized resources. A virtual resource is a piece of software configured to emulate a specific piece of hardware or alternatively may serve to abstract a resource that may have been accessed or addressed in a concrete manner. The combination of hardware resources and virtual resources is abstracted to a user or client system. Thus the user or client system does not require knowledge of the underlying workings of the cloud computing system. The client system may simply send a processing request to a supplied process and subsequently receive the designated processing result.

Cloud computing systems may be used for a variety of purposes. For example, Software as a Service (SaaS) is a model of software deployment in which a user accesses and uses a piece of software from a remote location. Instead of purchasing a license to operate the software on a local machine, a user may be charged by usage of the software which is available over the cloud computing system.

As the complexity of cloud computing systems increases, the process of accurately modeling the cloud computing system increases as well. Accurate modeling of the system may provide several benefits. For example, an accurate model may help with performance analysis and optimization. An accurate model may also help with usage data which may be used for billing.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 3 is a diagram showing an illustrative chart used to describe the process of creating a configuration value, according to one embodiment of principles described herein.

FIG. 4 is a diagram showing an illustrative sub-index chart depicting the relationship between configuration values and sub-index values, according to one embodiment of principles described herein.

Throughout the drawings, identical reference numbers designate similar, but not necessarily identical, elements.

DETAILED DESCRIPTION

Figure 1:
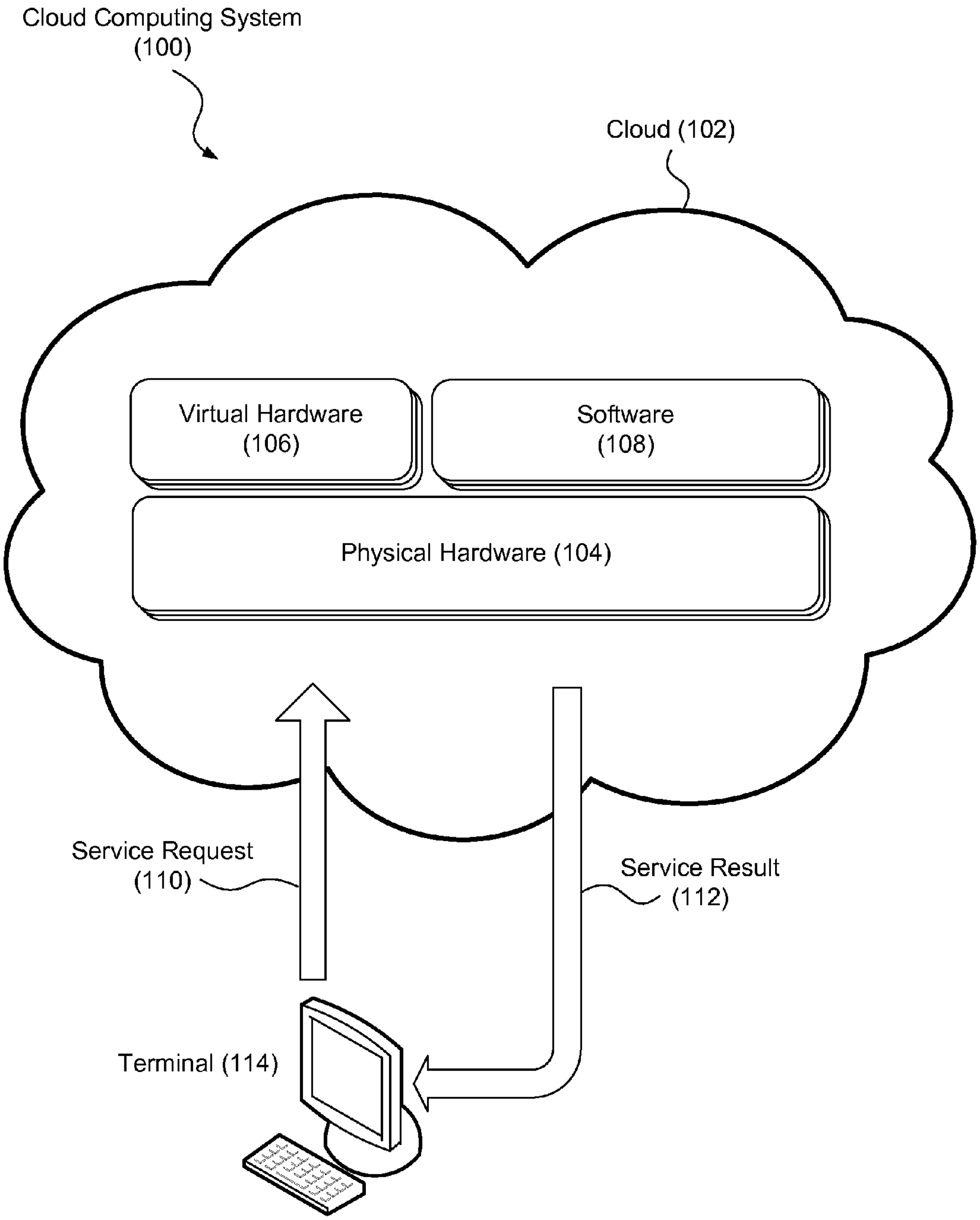
FIG. 1 is a diagram showing an illustrative cloud computing system, according to one embodiment of principles described herein.

As mentioned above, complex cloud computing systems may be difficult to model. In light of this and other difficulties, the present specification discloses a method for modeling cloud computing systems. According to certain illustrative embodiments, a unique index value from a number sequence may be assigned to a number of objects associated with the cloud computing system. An object may include both physical and virtual resources and services. The number sequence may be designed so that any combination of numbers from the number sequence is unique. A number of configuration values may then be created, each configuration value being based on a combination of index values. Thus each configuration value will represent a unique combination of resources and services. Each configuration value may then be associated with a number of sub-index values. The sub-index values may be based on a characteristic of the unique combination of objects indicated by the configuration value. Sub-index values may be derived from various formulas based on complexity or resiliency of certain combinations of objects. In some embodiments, objects may be functions that may be specified as a result of a Quality Management System (QMS) Requirements Analysis (Proprietary to Hewlett Packard (HP)).

In some embodiments, the sub-index values may be graphed, giving a user a visualization of the system. For example, the configuration values may be one axis and a first sub-index value may be represented by a second axis. If there are two sub-index values assigned to each configuration value, then three dimensional graphs may be used. If more than two sub-index values are associated with a configuration value, then hypercubes may be used to represent the data. The data may be partially graphed on multiple graphs to give a user a more complete visualization of the system.

A modeling method or system embodying principles described herein may be used to provide an accurate model of a cloud computing system. This model may be used to analyze and optimize system performance. Additionally, this model may be used to determine precise usage statistics for a particular application or service. These usages statistics may be useful for billing, sales, and other purposes.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout the specification and in the appended claims, the term "object" is to be broadly interpreted as an asset of a cloud computing system such as a piece of hardware, virtual hardware, software, and a service.

Referring now to the figures, FIG. 1 is a diagram showing an illustrative cloud computing system (100). According to certain illustrative embodiments, a cloud computing system (100) may include a cloud (102) made up of a combination of physical hardware (104), virtual hardware (106), and software (108). The cloud may be configured to receive service requests (110) from a client terminal (114) and return a service result (112).

As mentioned above, a cloud computing system (100) is a system in which multiple pieces of hardware and software are utilized over a network to perform specific computing tasks. The combination of hardware (104), virtual hardware (106), and software (108) is often referred to as the cloud (102). The cloud symbol is often used to represent the abstraction of a network.

Physical hardware (104) associated with the cloud (102) may include, among others, processors, memory devices, and networking equipment. The physical hardware (104) performs the actual computing and processing required by the cloud computing system (100).

Virtual hardware (106) is a type of software that is processed by physical hardware (104) but designed to emulate a specific set of hardware. For example, a particular piece of software may be designed to be run by a specific type of hardware. By running virtual hardware (106) on top of the physical hardware (106), a given piece of hardware may run software designed for many different types of hardware.

Software (108) may be defined as a set of instructions and data configured to cause a processor to perform specific processes. These processes may be used for running applications which are made available to an end user. Software must be designed to operate with specific hardware architecture. Hardware architecture may indicate the format of the processor instructions. Thus, one benefit of using virtual hardware is that multiple different hardware components can all operate the same software.

The physical hardware (104), virtual hardware (106), and the software (108) associated with the cloud may be configured to receive service requests (110) from a client terminal (114), the cloud computing system (100) may then perform the desired processes and return the result (112) to the client terminal (114).

Figure 2:
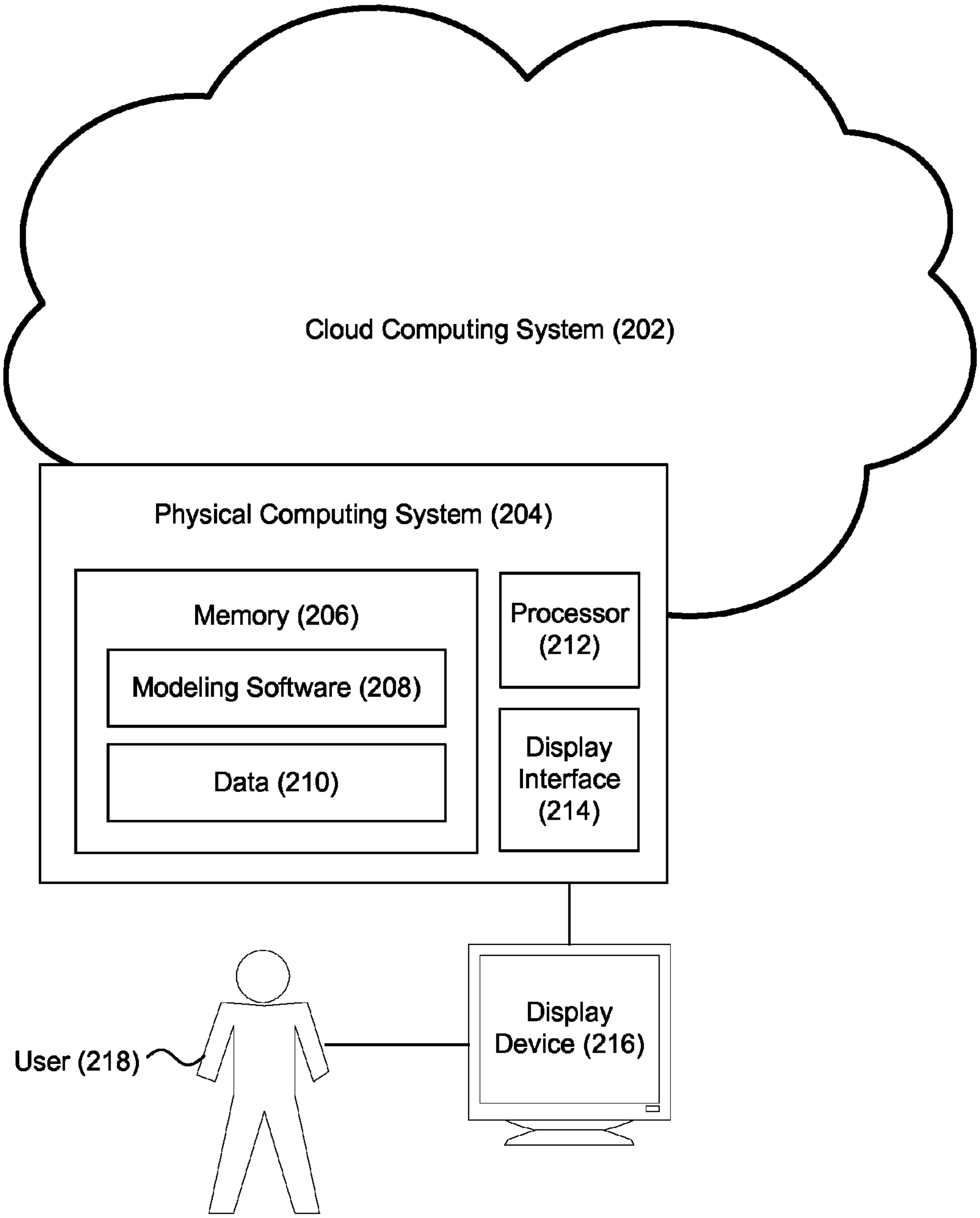
FIG. 2 is a diagram showing an illustrative physical computing system which may be used to model a cloud computing system, according to one embodiment of principles described herein.

FIG. 2 is a diagram showing an illustrative physical computing system (204) which may be used to model a cloud computing system (202). In some embodiments, the physical computing system (202) used to model the cloud computing system (202) may be internal to cloud computing system (202). Additionally or alternatively, the physical computing system (204) used to model the cloud computing system (202) may be external to the cloud computing system (202). According to certain illustrative embodiments, the physical computing system (204) may include memory (206) having modeling software (208) and data (210) stored thereon, a processor (212), and a display interface (214) configured to interact with a display device (216). The display device may then display data to a user (218).

Many types of memory (206) exist and may be used in conjunction with the physical computing system (204). Some types of memory, such as hard disk drives, optical disc drives, solid state drives, and other nonvolatile memory, are optimized for storage. Other types of memory, including volatile memory such as Random Access Memory (RAM), are optimized for speed and can be used as “working memory” for providing executable instructions to the processor (212). The various forms of memory may store information in the form of data (210) and modeling software (208). In certain embodiments, the memory (206) includes both nonvolatile and volatile memory.

The modeling software (208) may be defined as a set of instructions for the processor (212). The instructions may be stored in some form of memory (206). The modeling software (208) may be configured to instruct the processor (212) to perform functions relating to the modeling of a cloud computing system.

FIG. 3 is a diagram showing an illustrative chart (300) used to describe the process of creating a configuration value. According to certain illustrative embodiments, each object (302) within a cloud computing system may be assigned an index value (320) based on a given number sequence (310). A configuration value (322) may then be created to indicate a combination of objects (302).

Throughout this specification and in the appended claims, the term object may refer to a physical device, a virtual device, an application or application component, or service associated with the cloud computing system. As will be appreciated by those skilled in the relevant art, a particular application will require the use of a certain number of devices within the cloud computing system. For example, an application may make use of several physical devices (304) including a storage server, an application server, and network equipment. Additionally, the application may use a number of virtual devices (306) such as a Virtual Local Area Network (VLAN) and Virtual Servers. Furthermore, the application may use various services (308) which apply software involving areas such as the processing of scripts, applets, and other processing related functions.

To ensure that a configuration value represents a unique combination of objects (302) the number sequence may be designed so that a combination of values may form a unique number. One such number sequence is a prime number sequence (312). By summing any combination of values from a prime number sequence (312), a unique number is acquired. For example, if a given application made use of physical device 1, physical device 4, virtual device 1, and service 1, the sum of the corresponding index values (320) from the prime number sequence (312) is equal to 46. No other summation of index values from the prime number sequence (312) will equal the number 46. Thus, the number 46 indicates a unique combination of objects (302).

One sequence which may be used is a bitmap sequence (314). As will be appreciated by one skilled in the relevant art, there may be many ways to use bitmap-like number sequences to create a configuration value that will indicate a unique combination of values. However, only one example will be illustrated here.

According to certain illustrative embodiments, each object may be assigned a specific bit. The value of that bit may either be a “1” or a “0” based on if the object is included within a desired combination of objects. If the objects are represented in a column as shown in FIG. 3, then the top-most object may correspond to the Least Significant Bit (LSB) (316) and the bottom-most object may correspond to the Most Significant Bit (MSB) (318). Thus the column of ones and zeros may indicate a binary number. Using the same example as above in which an application uses physical device 1, physical device 4, virtual device 1, and service 1, then the configuration value (322) may be the binary representation in which those devices are assigned a “1” and the unused devices are assigned a “0”. As will be appreciated by those skilled in the relevant art, the binary number indicated in column 3 corresponds to the decimal number 89.

In some embodiments, metadata associated with each object (302) within the cloud computing system may be used to indicate an assigned index value. This metadata may also be maintained by the physical computing system performing the modeling of the cloud computing system.

FIG. 4 is a diagram showing an illustrative sub-index chart (400) depicting the relationship between configuration values (402) and sub-index values (404). According to certain illustrative embodiments, each configuration value (402) that indicates a unique combination of objects may be assigned a sub-index value (404) based on a characteristic of its unique combination of objects. These characteristics may include, but are not limited to, complexity (406) and resilience (408).

A number of sub-index values (404) may be assigned to a given configuration value (402). FIG. 4 illustrates a chart in which two sub-index values (404) have been assigned to each configuration value (402). However, in some embodiments one or more sub-index values (404) may be assigned to each configuration value (402). Each sub-index value may indicate a quantification of a property or characteristic of the combination of objects indicated by its corresponding configuration value (402).

The complexity (406) of a system may refer to the intricacy of the components which make up the system. There may be many ways in which to quantify the complexity of a given combination of objects. In one simple example, each object may be assigned a complexity value. The total complexity of the system may be determined by the sum of the complexity values for each object. However, as will be appreciated by one skilled in the art, the complexity of a system is often more complicated than a simple addition of complexity values. Thus, a developer of a modeling system may use a more sophisticated function to quantify a complexity value to be used as a sub-index value (404) for a given combination of objects.

The resiliency (408) of a system may refer to the system's ability to maintain an acceptable operability in light of a fault or error. As with the complexity of a system, there may be many ways to quantify the resiliency of a given combination of objects. Thus, a developer of a modeling system may use any suitable function to quantify a resiliency value to be used as a sub-index value (404) for a given combination of objects.

A model for a cloud computing system may include more than two characteristics which may be indicated by sub-index values (404). Any number of sub-index values indicating pertinent characteristics of the cloud computing system may be used.

Figure 5:
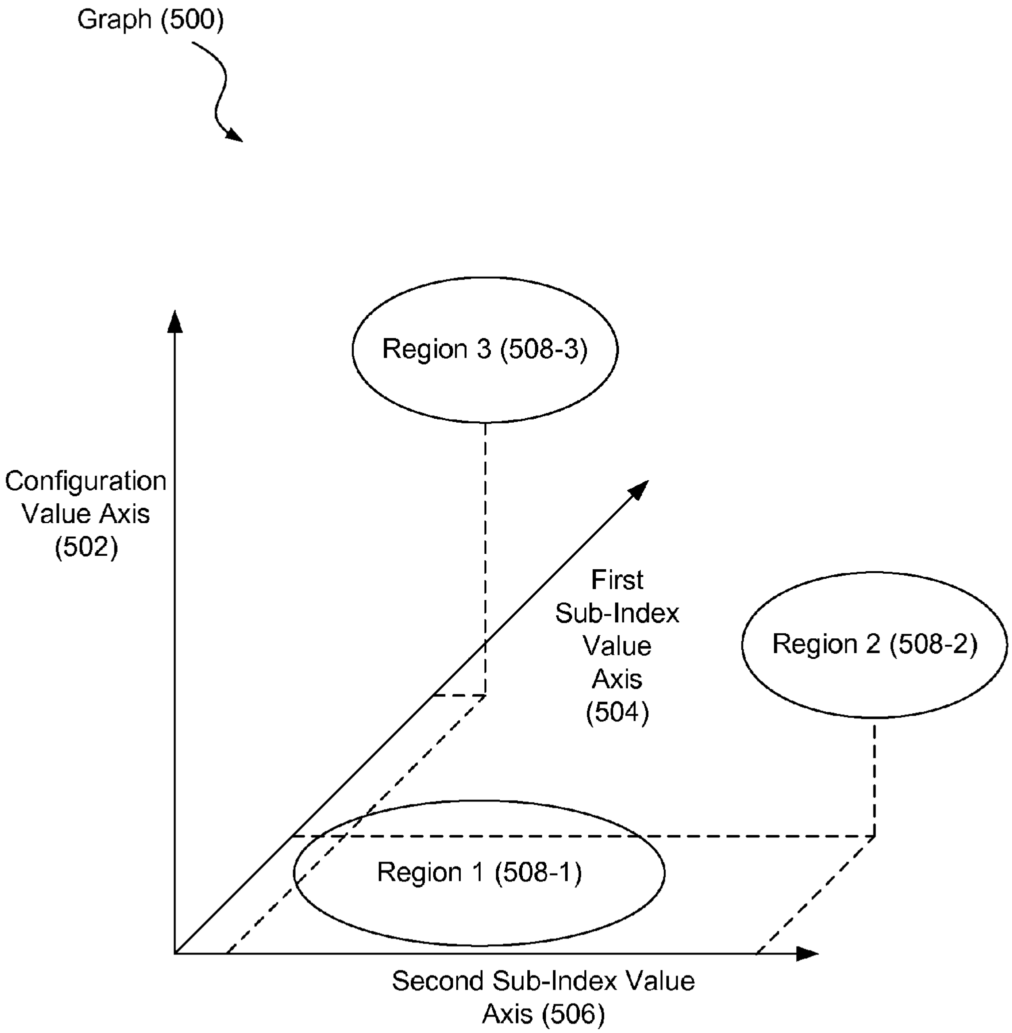
FIG. 5 is a diagram showing an illustrative graph used to represent characteristics of systems that are enabled to function in an integrated manner by system and control policy configuration values, according to one embodiment of principles described herein.

FIG. 5 is a diagram showing an illustrative graph (500) used to represent characteristics of systems that are enabled to function in an integrated manner by system and control policy configuration values. According to certain illustrative embodiments, the configuration values and associated sub-index values may be graphed. If there are two sub-index values, a three-dimensional graph may be displayed to a user. The graph (500) may include a configuration value axis (502), a first sub-index value axis (504), and a second sub-index value axis (506). The various points may reference different sub-systems within a cloud computing system. A sub-system may be made up of the objects of a cloud computing system indicated by a configuration value.

Region 1 (508-1) represents a cluster of sub-systems which have a lower configuration value, thus they include few objects. The position of region 1 also indicates that both sub-index values are relatively low. Using the example above in which the first sub-index value indicates complexity of the system and the second sub-index value indicates the relative value of the determined QMS requirement(s), in this case resiliency. Region 1 indicates systems which have low complexity and low resiliency. As will be appreciated by one skilled in the relevant art, a system with a lower number of objects often exhibits low complexity and low resiliency.

Region 2 (508-2) represents a cluster of sub-systems which have a slightly higher configuration value, thus they include more objects than region 1. The position of region 2 also indicates that both the first sub-index value and the second sub-index value indicate a system with greater complexity and resiliency than a system within region 1. As will be appreciated by one skilled in the relevant art, a system with additional objects often exhibits more complexity and resiliency than a system within region 1.

Region 3 (508-3) represents a cluster of sub-systems which have an even greater configuration value, thus they include more objects than region 2. The position of region 3 also indicates that the first sub-index value is relatively high and the second sub-index value is relatively low. Thus a system within region 3 exhibits high complexity and low resiliency.

Figure 6:
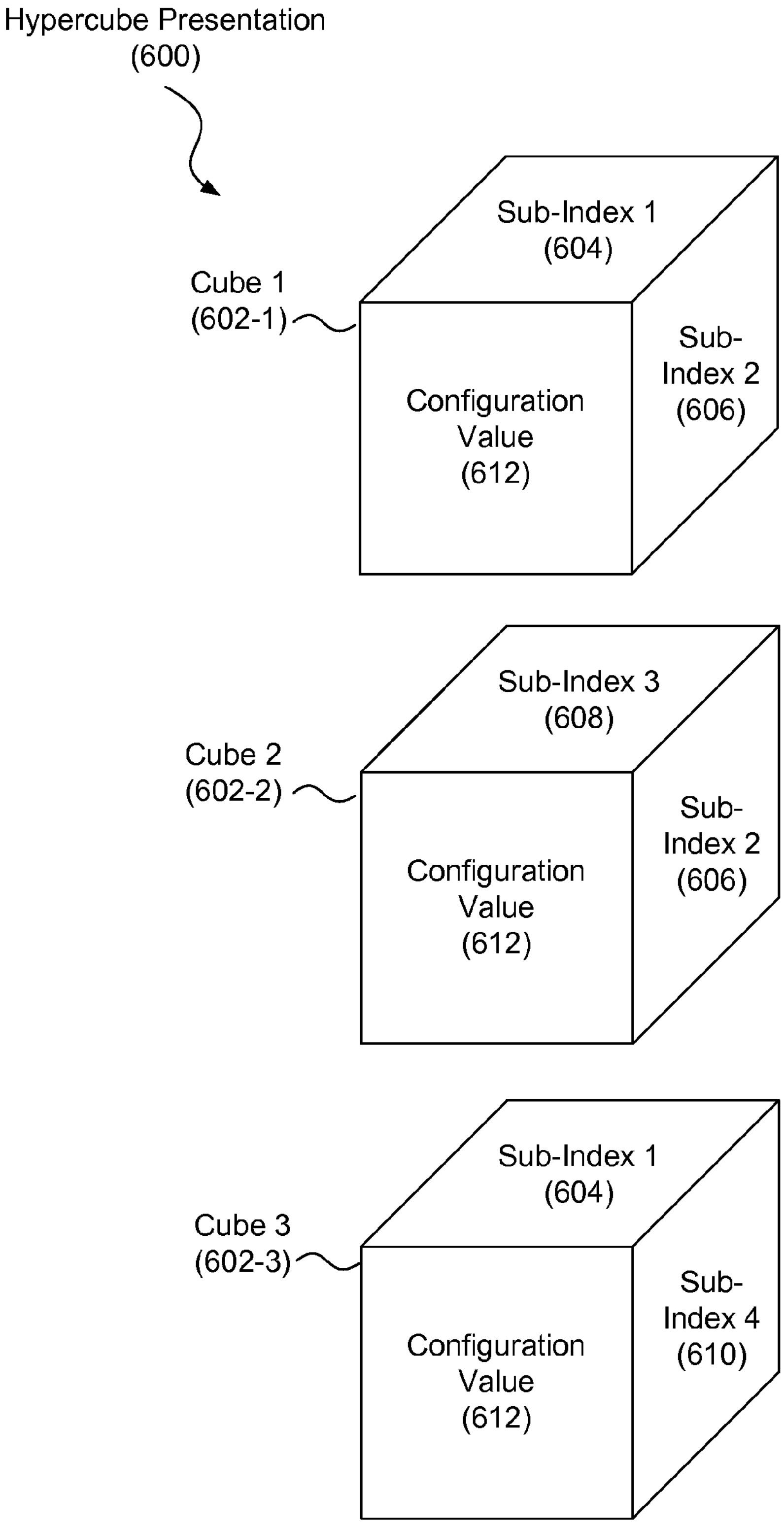
FIG. 6 is a diagram showing an illustrative hypercube presentation which may represent system data associated with the state of a cloud computing system, according to one embodiment of principles described herein.

FIG. 6 is a diagram showing an illustrative hypercube presentation (600) which may represent system data associated with the state of a cloud computing system. According to certain illustrative embodiments, a configuration value may be assigned more than two sub-index values. In such embodiments, the data which includes configuration values and all sub-index values may be represented by hypercubes. A hypercube is a theoretical cube having n-dimensions. When n is equal to 2, the hypercube is essentially a square. When n is equal to 3, the hypercube is a traditional cube. When n is greater than 3, the hypercube cannot be graphed using traditional 3D models.

In some embodiments, the dimensions of a hypercube may be illustrated with multiple three dimensional graphs represented in FIG. 6 as cubes (602). For example, cube 1 (602-1) illustrates a cube representing a three dimensional graph in which the axis are used to represent configuration value (612), sub-index 1 (604), and sub-index 2 (606). Additionally cube 2 (602-2) illustrates a cube representing a three dimensional graph in which the axis are used to represent configuration value (612), sub-index 3 (608), and sub-index 2 (606). Furthermore, cube 3 (602-3) illustrates a cube representing a three dimensional graph in which the axis are used to represent configuration value (612), sub-index 1 (604), and sub-index 4 (610).

By having multiple displays of several characteristics of a cloud computing system, a user may be able to view a more detailed model of the cloud computing system. This model may aid the user in analysis which may be used for a variety of purposes including, but not limited to, performance enhancement, sales, and billing.

Figure 7:
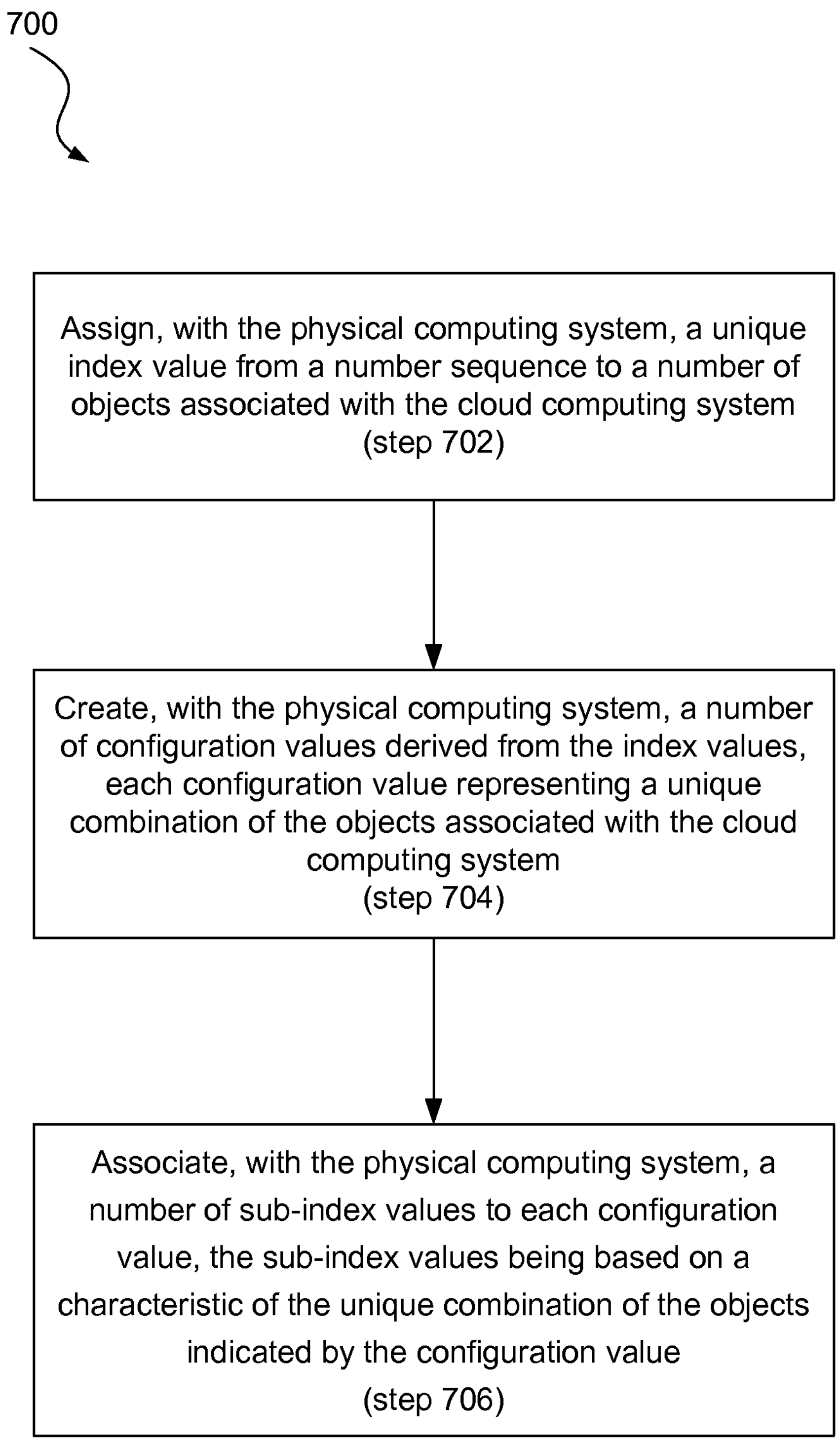
FIG. 7 is a flow chart showing an illustrative method for modeling a cloud computing system, according to one embodiment of principles described herein.

FIG. 7 is a flow chart showing an illustrative method (700) for modeling a cloud computing system. According to certain embodiments, the method may include assigning (step 702), with the physical computing system, a unique index value from a number sequence to a number of objects of the cloud computing system; creating (step 704), with the physical computing system, a number of configuration values, each configuration value based on a combination of index values, each configuration value representing a unique combination of the objects associated with the cloud computing system; and associating (step 706), with the physical computing system, a number of sub-index values to each configuration value, the sub-index values being based on a characteristic of the unique combination of the objects indicated by the configuration value.

In sum, a modeling method or system embodying principles described herein may be used to provide an accurate model of a cloud computing system. This model may be used to analyze and optimize system performance. Additionally, this model may be used to determine precise usage statistics for a particular application or service. These usages statistics may be useful for billing, sales, and other purposes.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method performed by a physical computing system for modeling services of a cloud computing system, the method comprising:

assigning, with said physical computing system, a unique index value from a number sequence to a number of objects of said cloud computing system;

creating, with said physical computing system, a number of configuration values, each configuration value being based on a combination of said index values, each configuration value representing a unique combination of said objects associated with said cloud computing system; and associating, with said physical computing system, a number of sub-index values to each said configuration value, said sub-index values being based on a characteristic of said unique combination of said objects indicated by said configuration value.

2. The method of claim 1, in which metadata associated with said cloud computing system maintains a record of index values assigned to each of said objects.

3. The method of claim 1, in which one of said objects is one of a virtual device associated with said cloud computing system and a physical device associated with said cloud computing system.

4. The method of claim 1, in which said combination of objects is associated with a specific service of said cloud computing system.

5. The method of claim 1, in which said characteristic of said unique combination of objects is indicative of a complexity of a system formed by said combination.

6. The method of claim 1, in which said characteristic of said unique combination of objects is indicative of a resilience of a system formed by said combination.

7. The method of claim 1, in which said number sequence is a prime number sequence.

8. The method of claim 1, in which said number sequence is a bitmap sequence.

9. The method of claim 1, further comprising forming an N-dimensional hypercube representing said configuration values and said sub-index values, N being equal to said number of sub-index values plus one.

10. The method of claim 9, further comprising displaying to a user through a display device, a graphic representation of up to three dimensions of said hypercube.

11. A computing device for modeling a cloud computing system, the device comprising:

a processor; and a memory communicatively coupled to said processor;

in which said processor is configured to:

assign a unique index value from a number sequence to a number of objects associated with said cloud computing system;

create a number of configuration values, each configuration value being based on a combination of said index values, each configuration value representing a unique combination of said objects associated with said cloud computing system; and associate a number of sub-index values to each said configuration value, said sub-index values being based on a characteristic of said unique combination of said objects indicated by said configuration value.

12. The device of claim 11, in which metadata associated with said cloud computing system maintains a record of index values assigned to each of said objects.

13. The device of claim 11, in which one of said objects is one of a virtual device associated with said cloud computing system and a physical device associated with said cloud computing system.

14. The device of claim 11, in which said combination of objects is associated with a specific service of said cloud computing system.

15. The device of claim 11, in which said characteristic of said unique combination of objects is indicative of a complexity of a system formed by said combination.

16. The device of claim 11, in which said characteristic of said unique combination of objects is indicative of a resilience of a system formed by said combination.

17. The device of claim 11, in which said number sequence is one of: a prime number sequence and a bitmap sequence.

18. The device of claim 11, in which said processor is further configured to form an N-dimensional hypercube representing said configuration values and said sub-index values, N being equal to said number of sub-index values plus one.

19. The device of claim 18, further comprising a display device;

in which said processor is further configured to display to a user through said display device, a graphic representation of up to three dimensions of said hypercube.

20. A computer program product for modeling a cloud computing system, said computer program product comprising:

a computer readable storage device having computer readable code embodied therewith, said computer readable program code comprising:

computer readable program code configured to assign a unique index value from a number sequence to a number of objects associated with said cloud computing system;

computer readable program code configured create a number of configuration values, each configuration value being based on a combination of said index values, each configuration value representing a unique combination of said objects associated with said cloud computing system; and computer readable program code configured to associate a number of sub-index values to each said configuration value, said sub-index values being based on a characteristic of said unique combination of said objects indicated by said configuration value.

21. The computer program product of claim 20, in which one of said objects is a service of said cloud computing system.

22. The computer program product of claim 20, in which one of said objects is an application of said cloud computing system.

* * * * *

UNITED STATES PATENT AND TRADEMARK OFFICE
CERTIFICATE OF CORRECTION

PATENT NO. : 8,589,475 B2
APPLICATION NO. : 12/695622
DATED : November 19, 2013
INVENTOR(S) : Jonathan Richard Eccles It is certified that error appears in the above-identified patent and that said Letters Patent is hereby corrected as shown below:

In the Claims:

In column 8, line 44, in Claim 20, delete "configured" and insert -- configured to --, therefor.

Signed and Sealed this
Eighteenth Day of March, 2014

Michelle K. Lee
*Deputy Director of the United States Patent and Trademark Office*